(12) United States Patent
Nishikawa et al.

(10) Patent No.: US 7,924,721 B2
(45) Date of Patent: Apr. 12, 2011

(54) COMMUNICATION APPARATUS, TRANSMISSION CONTROL METHOD, AND TRANSMISSION CONTROL PROGRAM

(75) Inventors: Kenzoh Nishikawa, Kanagawa (JP); Kazuyuki Sakoda, Tokyo (JP); Yuichi Morioka, Tokyo (JP); Chihiro Fujita, Kanagawa (JP); Erika Saito, Tokyo (JP)

(73) Assignee: Sony Corporation, Tokyo (JP)

( * ) Notice: Subject to any disclaimer, the term of this patent is extended or adjusted under 35 U.S.C. 154(b) by 293 days.

(21) Appl. No.: 11/715,930

(22) Filed: Mar. 9, 2007

(65) Prior Publication Data

US 2007/0268897 A1 Nov. 22, 2007

(30) Foreign Application Priority Data

Mar. 16, 2006 (JP) ................. 2006-073186

(51) Int. Cl.
*H04L 12/26* (2006.01)
*H04L 12/56* (2006.01)
*G06F 15/16* (2006.01)
*G06F 15/173* (2006.01)
*G06F 13/00* (2006.01)

(52) U.S. Cl. ........ 370/235; 370/252; 370/412; 709/232; 709/238; 711/100

(58) Field of Classification Search ............. 370/235, 370/252, 412; 709/232, 238; 711/100
See application file for complete search history.

(56) References Cited

U.S. PATENT DOCUMENTS

| | | | |
|---|---|---|---|
| 6,108,692 A * | 8/2000 | Van Seters et al. | 709/213 |
| 6,421,348 B1 * | 7/2002 | Gaudet et al. | 370/401 |
| 6,480,477 B1 * | 11/2002 | Treadaway et al. | 370/314 |
| 6,574,351 B1 * | 6/2003 | Miyano | 382/101 |
| 6,614,763 B1 * | 9/2003 | Kikuchi et al. | 370/252 |
| 6,751,201 B1 * | 6/2004 | Koshiba | 370/278 |
| 6,859,824 B1 * | 2/2005 | Yamamoto et al. | 709/217 |
| 6,914,903 B1 * | 7/2005 | Miyazaki et al. | 370/389 |
| 7,023,799 B2 * | 4/2006 | Takase et al. | 370/230.1 |
| 7,260,645 B2 * | 8/2007 | Bays | 709/238 |
| 7,395,396 B2 * | 7/2008 | Takahashi et al. | 711/165 |
| 7,506,101 B2 * | 3/2009 | Liu et al. | 711/114 |

(Continued)

FOREIGN PATENT DOCUMENTS

CN 1589439 3/2005

(Continued)

OTHER PUBLICATIONS

Japanese Office Action in corresponding Japanese Patent Application 2006-073186 dated Jun. 2, 2009 (2 pages).

(Continued)

*Primary Examiner* — Alpus H Hsu
(74) *Attorney, Agent, or Firm* — Finnegan, Henderson, Farabow, Garrett & Dunner, L.L.P.

(57) ABSTRACT

A communication apparatus includes a storage unit having a plurality of storage areas corresponding to a plurality of candidates of a destination of data to be transmitted, a detecting unit for detecting the amount of data stored in each of the storage areas, a destination selecting unit for selecting one destination from among the destination candidates on the basis of at least the amount of data detected by the detecting unit, and a transmission signal generating unit for reading out a predetermined amount of data to be transmitted to the destination selected by the destination selecting unit, from the corresponding storage area, and generating a transmission signal.

9 Claims, 10 Drawing Sheets

U.S. PATENT DOCUMENTS

| | | | |
|---|---|---|---|
| 7,549,016 B2 * | 6/2009 | Fujibayashi et al. | 711/112 |
| 7,613,878 B2 * | 11/2009 | Mori et al. | 711/114 |
| 7,616,567 B2 * | 11/2009 | Shinagawa et al. | 370/231 |
| 2002/0146037 A1 | 10/2002 | Sugaya et al. | |
| 2003/0095447 A1 | 5/2003 | Dean | |
| 2006/0036820 A1 * | 2/2006 | Ejiri et al. | 711/158 |

FOREIGN PATENT DOCUMENTS

| | | |
|---|---|---|
| CN | 1613234 | 5/2005 |
| JP | 2-218241 | 8/1990 |
| JP | 4-13390 | 1/1992 |
| JP | 4-100346 | 4/1992 |
| JP | 6-197120 | 7/1994 |
| JP | 7-79252 | 3/1995 |
| JP | 10-190693 | 7/1998 |
| JP | 11-17685 | 1/1999 |
| JP | 2000-307582 | 11/2000 |
| JP | 2001-230804 | 8/2001 |
| JP | 2002-261866 | 9/2002 |
| JP | 2003-229894 | 8/2003 |
| JP | 2003-283556 | 10/2003 |
| JP | 2004-72569 | 3/2004 |
| JP | 2006-67090 | 3/2006 |
| WO | WO 03/043273 | 5/2003 |

OTHER PUBLICATIONS

First Office Action mailed May 22, 2009 in corresponding Chinese Patent Application No. 200710088554.1 (7 pages) and English translation (9 pages).

* cited by examiner

COMMUNICATION APPARATUS, TRANSMISSION CONTROL METHOD, AND TRANSMISSION CONTROL PROGRAM

CROSS REFERENCES TO RELATED APPLICATIONS

The present invention contains subject matter related to Japanese Patent Application JP 2006-073186 filed in the Japanese Patent Office on Mar. 16, 2006, the entire contents of which are incorporated herein by reference.

BACKGROUND OF THE INVENTION

1. Field of the Invention

The present invention relates to communication apparatuses, transmission control methods, and transmission control programs selecting transmission destinations of transmission signals from among transmission destination candidates.

2. Description of the Related Art

In a communication system including a plurality of terminals, an algorithm such as a round-robin algorithm and a max-queue algorithm which allows a terminal to select a transmission destination (destination) of data is used. As illustrated in FIG. 8, in such a round-robin algorithm, individual destination candidates (terminals A to D) are sequentially selected as the destination of data. In a max-queue algorithm, as illustrated in FIG. 9, destination is selected on the basis of the number of packets stored in a transmission buffer for storing packets destined for each destination candidate. As illustrated in FIG. 9, in the max-queue algorithm, a destination candidate for packets stored in the transmission buffer in the greatest number is selected as the destination. In initiating communication, each terminal selects the destination of packets on the basis of such an algorithm and performs processing for generating a transmission frame to be transmitted to the selected destination.

For such processing of generating a transmission frame, a technique is used in which a plurality of packets are concatenated to create a single frame with a view to increasing the ratio of payload to overhead in the frame, as illustrated in FIG. 10. In this technique, however, when the sizes of individual packets are small or the number of packets to be concatenated is small, the ratio of the size of a payload portion to the size of an overhead portion including a preamble and a PHY (physical layer) header does not sufficiently increase by the packet concatenation, as illustrated in FIG. 11. Thus, with this technique, data transmission efficiency can hardly be increased even if a plurality of packets are concatenated.

As described above, a destination selection algorithm such as the max-queue algorithm depends on the number of packets stored in a transmission buffer for each destination candidate. Thus, in such an algorithm, no transmission opportunity may be given to a destination candidate for packets for which the number of stored in the transmission buffer is smaller than the numbers of packets stored for other destination candidates, unless the number of packets for the other destination candidates decreases. In particular, when the individual terminals (destination candidates) communicate through a TCP (transmission control protocol) connection, the number of packets generated for a terminal with high transmission frequency is greater than the number of packets generated for a terminal with low transmission frequency. Thus, the number of packets for the terminal with low transmission frequency is gradually decreased, and consequently the communication to the terminal is disconnected.

When data is transmitted to a terminal in a poor communication state in a communication system, it is highly possible that an error occurs and thus no ACK (ACKnowledgement) is sent from the terminal. Thus, to increase substantial communication speed, the communication system selects a terminal in a good communication state as the destination rather than a terminal with the possibility of the occurrence of an error. However, in an algorithm such as the round-robin algorithm which equally provides a transmission opportunity to every terminal in the communication system, communication resources of a communication apparatus have to be allocated for processing of data transmission to a terminal in a poor communication state. This results in a decrease in the substantial communication speed of the entire system.

To address this problem, Japanese Unexamined Patent Application Publication No. 2002-261866 discloses a packet transmission scheduling device. In this device, selection methods are switched over so that resources of a communication device in a communication system are not allocated to a destination in a poor communication state. This allows the resources to be efficiently distributed, and thus increases the communication speed of the entire communication system.

For some types of application, transmission delay or jitter has to be suppressed to a low level in transmitting data to a certain destination candidate. However, when an algorithm such as the max-queue algorithm that selects a destination on the basis of information from transmission buffer and the round-robin algorithm is used, a transmission opportunity may not be given to such a destination candidate. This makes it difficult to suppress the transmission delay or jitter in the data transmission.

SUMMARY OF THE INVENTION

The present invention has been made in view of the above circumstances. Accordingly, there is a need for a communication apparatus, a transmission control method, and a transmission control program for realizing high transmission efficiency.

Thus, a communication apparatus according to an aspect of the present invention includes a storage unit having a plurality of storage areas corresponding to a plurality of candidates of a destination of data to be transmitted, a detecting unit for detecting the amount of data stored in each of the storage areas, a destination selecting unit for selecting one destination from among the destination candidates on the basis of at least the amount of data detected by the detecting unit, and a transmission signal generating unit for reading out a predetermined amount of data to be transmitted to the destination selected by the destination selecting unit, from the corresponding storage area, and generating a transmission signal.

A transmission control method according to an aspect of the present invention includes the steps of detecting from a storage unit having a plurality of storage areas corresponding to a plurality of candidates of a destination of data to be transmitted the amount of data stored in each of the storage areas, selecting the destination from among the destination candidates on the basis of at least the amount of data detected in the detecting step, and reading a predetermined amount of data for the selected destination from the corresponding storage area and generating a transmission signal for the selected destination.

A transmission control program according to an aspect of present invention is executed by a computer provided in a communication apparatus for performing communication with a plurality of destination candidates. The program includes the steps of detecting from a storage unit having a plurality of storage areas corresponding to a plurality of candidates of a destination of data to be transmitted the amount of data stored in each of the storage areas, selecting the destination from among the destination candidates on the basis of at least the amount of data detected in the detecting step, and reading a predetermined amount of data for the selected destination from the corresponding storage area and generating a transmission signal for the selected destination.

According to an embodiment of the present invention, an appropriate destination is determined by selecting one destination candidate as a destination from among a plurality of destination candidates on the basis of at least the amount of data stored in a storage unit. With this arrangement, a communication system with high transmission efficiency can be realized.

DESCRIPTION OF THE PREFERRED EMBODIMENTS

In the following, the preferred embodiments of the present invention will be described with reference to the accompanying drawings.

Figure 1:
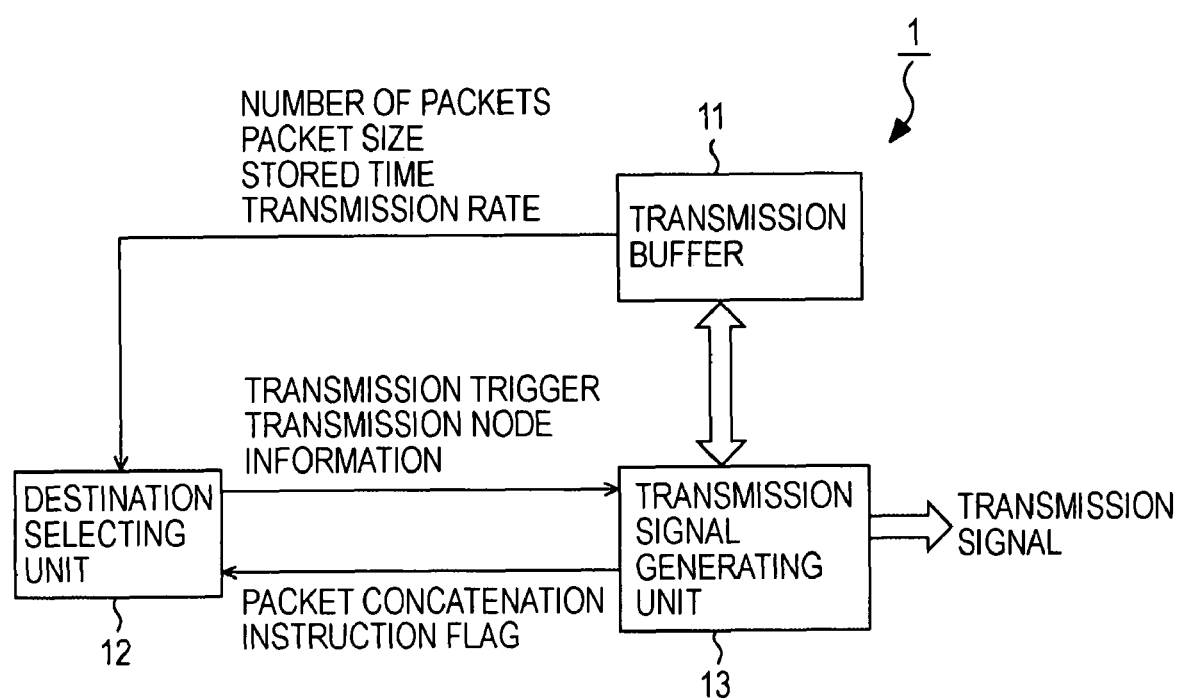
FIG. 1 is a block diagram illustrating a configuration of a transmission control unit.

Referring to FIG. 1, a configuration of a transmission control unit 1 included in a communication apparatus according to an embodiment of the present invention for performing data communication with a plurality of terminals will be described. The transmission control unit 1 serves as a processing unit for controlling processing of data transmission to the plurality of terminals. As illustrated in FIG. 1, the transmission control unit 1 includes a transmission buffer 11, a destination selecting unit 12, and a transmission signal generating unit 13.

The transmission buffer 11 has a queue for each transmission destination candidate (terminal) for temporarily storing packets to be transmitted to the destination candidate. The transmission buffer 11 stores information including the number of packets in each queue which are to be transmitted to a corresponding destination candidate, the size of the packets, a time at which the packets are stored in the queue (stored time), and a transmission rate at which the packets are transmitted.

The destination selecting unit 12 selects an appropriate destination from among a plurality of destination candidates on the basis of information from the transmission buffer 11 including the numbers of packets, the sizes of the packets, the stored times of the packets for the individual destination candidates, and the transmission rates of the packets. Upon selecting the destination from among the destination candidates, the destination selecting unit 12 sends the transmission signal generating unit 13 a transmission trigger and transmission node information.

When receiving the transmission trigger and the transmission node information from the destination selecting unit 12, the transmission signal generating unit 13 reads out from the transmission buffer 11 transmission data destined for the destination candidates corresponding to the destination information. Then, the transmission signal generating unit 13 creates a transmission frame and generates a transmission signal.

The transmission signal generating unit 13 instructs the destination selecting unit 12 to or not to concatenate packets to be transmitted using a packet concatenation instruction flag, on the basis of the type of data read from the transmission buffer 11 or the communication speed of the data. Specifically, the transmission signal generating unit 13 enables the packet concatenation instruction flag if the packets are concatenated to form a transmission frame and disables the packet concatenation instruction flag if the packets are not concatenated to form a transmission frame.

In the following, six embodiments of the present invention will be described in regard to operations of the destination selecting unit 12 for selecting the optimum destination from among a plurality of destination candidates.

First Embodiment

Firstly, features to be implemented in this embodiment are briefly described. In data transmission, a plurality of packets may be aggregated into a frame to be transmitted from a communication apparatus to a destination (this technique is generally called packet aggregation, in which multiple packets are transmitted using a single frame). When a frame is transmitted using this technique, desired data transmission efficiency may not be ensured if the amount of data to be transmitted to the destination is below a predetermined threshold. In view of this circumstance, in a communication apparatus according to the present embodiment, the optimum threshold for the number of packets of data to be transmitted to each destination candidate or for the amount of data in a queue is set. Then, when the amount of data to be transmitted to the destination candidate exceeds the threshold, the destination candidate is selected as the destination.

Figure 2:
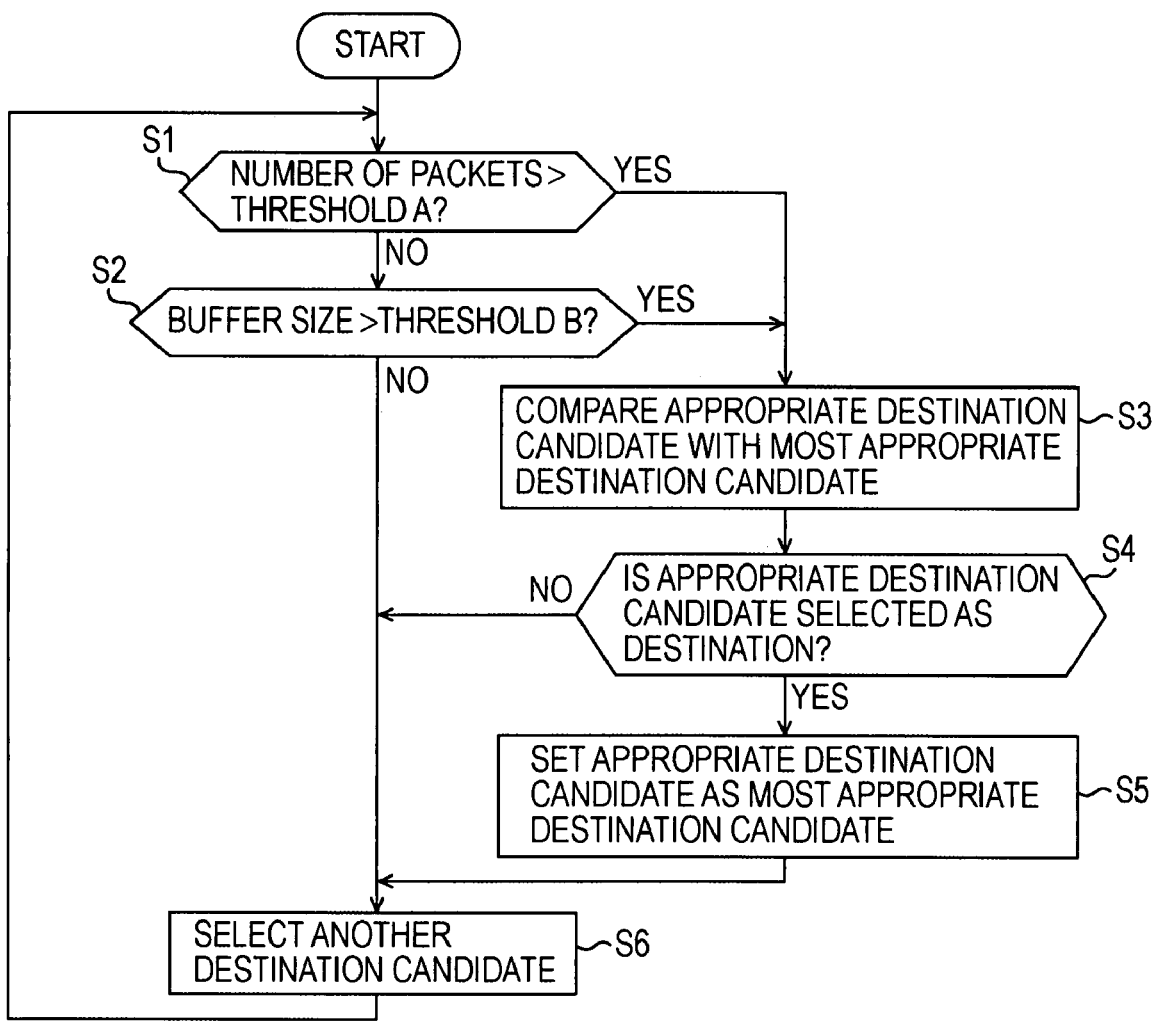
FIG. 2 is a flowchart illustrating a processing procedure performed by a destination selecting unit according to an embodiment of the present invention.

Referring now to FIG. 2, a processing procedure performed by the destination selecting unit 12 will be described in detail. As an assumption, the transmission signal generating unit 13 has performed processing for concatenating packets to generate a transmission frame and, in conjunction with this processing, enabled the packet concatenation instruction flag. In addition, the destination selecting unit 12 is assumed to have read out from the transmission buffer 11 the number of stored packets and the size of the packets for each destination candidate in an early stage of the procedure.

At STEP S1, the destination selecting unit 12 determines whether or not the number of stored packets of a destination candidate, which has been read out from the transmission buffer 11, exceeds a threshold A. Note that in this case, if a number of packets which exceeds the threshold A are concatenated, it is determined that the ratio of overhead size to payload size in a transmission frame generated by the transmission signal generating unit 13 becomes sufficiently large.

If it is determined in STEP S1 that the number of stored packets does not exceed the threshold A, the procedure proceeds to STEP S2. On the other hand, if it is determined that the number of store packets exceeds the threshold A, the destination selecting unit 12 sets the destination candidates as an appropriate destination candidate, and then the procedure proceeds to STEP S3.

At STEP S2, the destination selecting unit 12 calculates a buffer size stored in a queue of the transmission buffer 11 which corresponds to the destination candidates on the basis of the number of store packets and the size of the packets which have been read from the transmission buffer 11, and determines whether or not the buffer size exceeds a threshold B. Note that in this case, if packets whose data size is equal to or greater than the threshold B are concatenated, it is determined that the ratio of overhead size to payload size in a transmission frame generated by the transmission signal generating unit 13 becomes sufficiently large.

If the destination selecting unit 12 determines that the buffer size does not exceed the threshold B, the procedure proceeds to STEP S6. On the other hand, if it is determined that the buffer size exceeds the threshold B, the destination selecting unit 12 sets the destination candidate as an appropriate destination candidate, and then the procedure proceeds to STEP S3.

At STEP S3, the destination selecting unit 12 compares the appropriate destination candidate set in the processing of STEP S1 or STEP S2 with the most appropriate destination candidate in terms of the number of stored packets and the buffer size, and the procedure proceeds to STEP S4. Note that the most appropriate destination candidate refers to a transmission candidate which is given the highest priority among other destination candidates. The priority is determined on the basis of the numbers of stored packets to be transmitted to the individual destination candidates and the sizes of the packets as well as the stored times and the transmission rates of the packets.

At STEP S4, the destination selecting unit 12 determines whether or not to select the appropriate destination candidate set in the processing of STEP S1 or STEP S2 as the destination, on the basis of the result of the comparison of the processing of STEP S3. If the destination selecting unit 12 selects the appropriate destination candidate as the destination, the procedure proceeds to STEP S5. If the destination selecting unit 12 does not select the appropriate destination candidate as the destination, the procedure proceeds to STEP S6.

At STEP S5, the destination selecting unit 12 sets the appropriate destination candidate set in the processing of STEP S1 or STEP S2 as the most appropriate destination candidate, and then the processing proceeds to STEP S6.

At STEP S6, the destination selecting unit 12 reads the number of stored packets of another destination candidate and the size of the packets, and the processing returns to STEP S1.

As described above, the destination selecting unit 12 determines whether or not sufficient transmission efficiency can be obtained in the case where packets are concatenated to form a transmission frame destined for a destination candidate, on the basis of the threshold A and the threshold B. Then, the destination selecting unit 12 excludes the destination candidate that is determined not to bring about sufficient transmission efficiency from the selection of destination candidates. With this arrangement, the transmission signal generating unit 13 can generate a transmission frame with a sufficiently increased ratio of the payload size to the overhead size, which substantially increases communication speed.

Second Embodiment

Features implemented in the present embodiment will be briefly described. Similarly to the first embodiment, a frame transmission is executed when the amount of data to be transmitted to a destination exceeds a predetermined threshold. However, this embodiment is different from the first embodiment in that a time period during which data to be transmitted to a destination candidate is waited in a queue (queuing time) is considered as well as the amount of data in determining a destination.

Specifically, the destination selecting unit 12 sets an appropriate destination candidate on the basis of the threshold A and the threshold B, similarly to the first embodiment. At the same time, a time at which packets are stored (stored time) is read from the transmission buffer 11 for each destination candidate, and selection of an actual destination is performed on the basis of the read stored time. Note that the stored time is herein referred to as a time point at which packets are stored in the transmission buffer 11.

Figure 3:
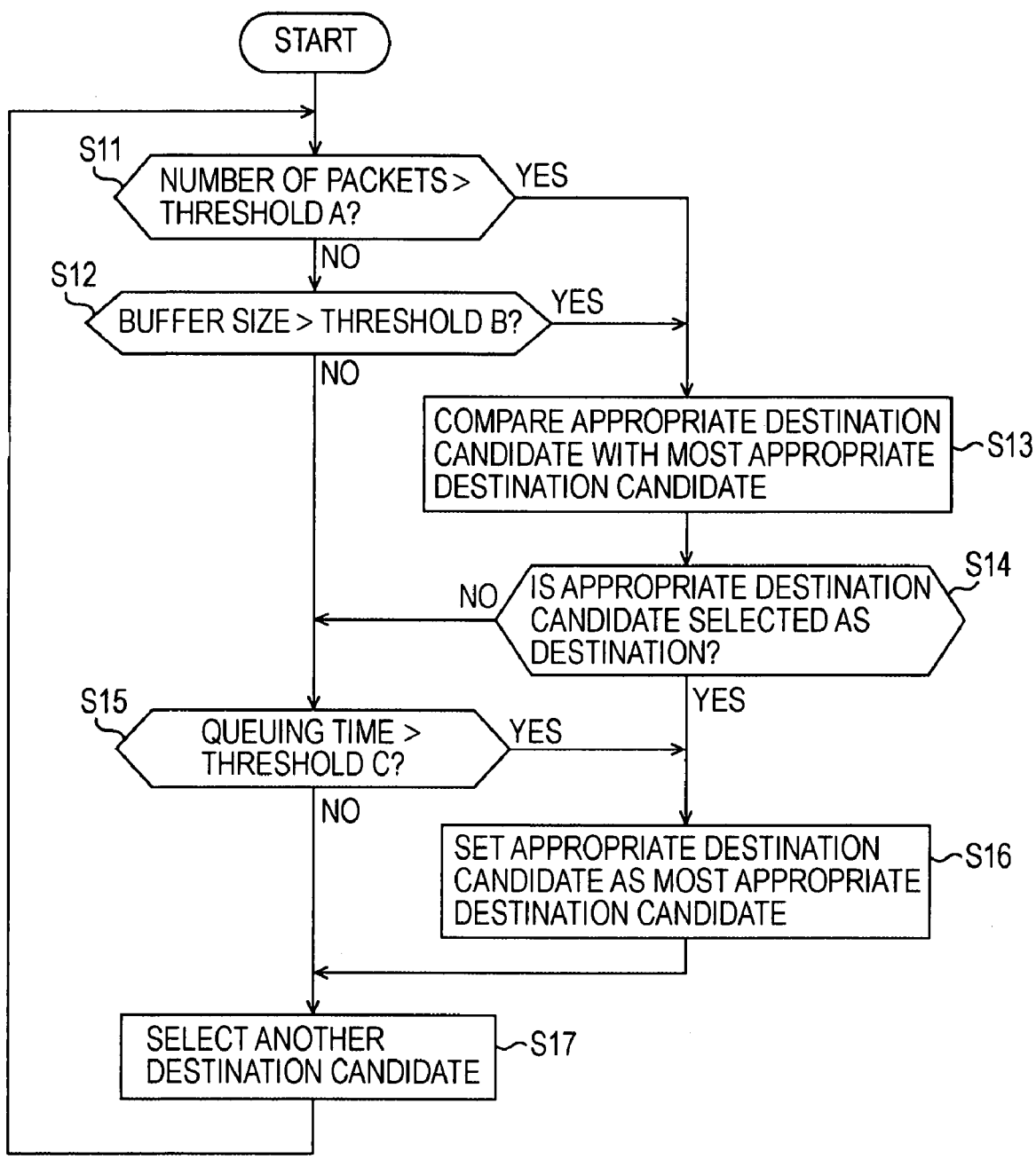
FIG. 3 is a flowchart illustrating a processing procedure performed by a destination selecting unit according to an embodiment of the present invention.

Referring to FIG. 3, a processing procedure performed by the destination selecting unit 12 will be described. In FIG. 3, processing of STEP S11 to STEP S14 corresponds to the processing of STEP S1 to STEP S4 described with reference to FIG. 2, and thus the description thereof will be omitted. When the destination selecting unit 12 determines that a buffer size does not exceed the threshold B at STEP S12, the processing proceeds to STEP S15. In addition, the procedure proceeds from STEP S14 to STEP S16 if an appropriate destination candidate is selected as the destination and proceeds from STEP S14 to STEP S15 if the appropriate destination candidate is not selected as the destination.

At STEP 15, the destination selecting unit 12 calculates a queuing time of packets of the appropriate destination candidate, on the basis of the stored time of the packets read from the transmission buffer 11 and a current time. As mentioned above, the queuing time starts at a time point when the packets are stored in the transmission buffer 11 and ends a time point when the packets are read out by the transmission signal generating unit 13. Then, the destination selecting unit 12 determines whether or not the calculated queuing time exceeds a threshold C. The threshold C is a value obtained by subtracting a value corresponding to a minimum allowance from a value corresponding to a maximum allowable transmission delay. In STEP S15, if it is determined that the queuing time exceeds the threshold C, the procedure proceeds to STEP S16. On the other hand, if it is determined that the queuing time does not exceed the threshold C, the procedure proceeds to STEP S17.

At STEP S16, the destination selecting unit 12 sets the appropriate destination candidate that satisfies either of the conditions of the determination operations of STEP S11, STEP S12, and STEP S13 as the most appropriate destination candidate, and then the procedure proceeds to STEP S17.

At STEP S17, the destination selecting unit 12 reads out the number of stored packets to be transmitted to another destination candidate and the size of the packets from the transmission buffer 11, and the procedure returns to STEP S11.

As described above, the destination selecting unit 12 according to this embodiment preferentially sets a transmission candidate, which has been determined not to bring about sufficient efficiency in transmitting concatenated packets in the determination processing of STEP S11 and STEP S12, as the most appropriate destination candidate, if it is determined in STEP S15 that the queuing time of the packets exceeds the threshold C.

In the processing procedure of the first embodiment, transmission data (packets) to be transmitted to a destination candidate remains stored in a queue of the transmission buffer 11 until the data satisfies either of the conditions of the determination processing of STEP S1 and STEP S2. Thus, the transmission delay time may exceed the maximum allowable delay time. On the other hand, in this embodiment, the destination selecting unit 12 can select every destination candidate as a destination without allowing the transmission delay time of data of the destination candidate to exceed the maximum allowable delay time. This also brings about an increase in transmission efficiency resulted from the packet concatenation.

Third Embodiment

Features to be implemented in this embodiment will be briefly described. For some types of application employed in a destination, there may be a case where data is requested to be transmitted to the destination without delay associated with aggregation processing in generation of a transmission signal. Thus, in a communication apparatus according to the present embodiment, it is determined whether or not aggregation processing for generating a transmission frame is effective in accordance with a type of application. Then, a destination selection algorithm is selected on the basis of a result of this determination processing. With this arrangement, an increase in transmission efficiency can be realized.

In the following, a processing procedure performed by the destination selecting unit 12 according to the present embodiment will be described with reference to FIG. 4.

At STEP S21, the destination selecting unit 12 whether or not a packet concatenation instruction flag provided by the transmission signal generating unit 13 is enabled. In this step, if it is determined that the packet concatenation instruction flag is enabled, the procedure proceeds to STEP S22. On the other hand, it is determined that the packet concatenation instruction flag is disabled, the processing proceeds to STEP S23. In this step, the transmission signal generating unit 13 determines whether or not to enable the packet concatenation instruction flag in accordance with an application for data to be transmitted, for each transmission candidate.

At STEP S22, the destination selecting unit 12 selects a destination from among destination candidates on the basis of the max-queue algorithm, and then the procedure proceeds to STEP S24. According to the max-queue algorithm, a destination candidate for packets stored in a queue of the transmission buffer 11 in the greatest number is selected as the destination.

At STEP S23, the destination selecting unit 12 selects a destination from among the destination candidates on the basis of a round-robin algorithm, and the procedure proceeds to STEP S24. According to the round-robin algorithm, a transmission opportunity is sequentially given to each destination candidate.

At STEP S24, the destination selecting unit 12 determines the destination by the selection processing of STEP S22 or the STEP S23.

At STEP S25, the destination selecting unit 12 causes the transmission signal generating unit 13 to generate a transmission signal to be transmitted to the determined destination.

As described above, the destination selecting unit 12 uses both the max-queue algorithm and the round-robin algorithm and selects one out of these algorithms so as to determine the destination.

In relation to the processing of STEP S21, the transmission signal generating unit 13 determines whether or not to enable the packet concatenation instruction flag, on the basis of the type of data. For example, in a VOIP (voice over Internet protocol) communication in which audio data is sent and received through a TCP/IP network, the maximum delay time of the data has to be kept as short as possible. In transmitting such data, the transmission signal generating unit 13 disables the packet concatenation instruction flag. On the other hand, there is a case where the communication speed of an entire communication system has to be as high as possible even if the maximum delay time is increased as necessary. In this case, with the round-robin algorithm which equally gives a transmission opportunity to every destination candidate, a packet concatenation function cannot work effectively compared with the max-queue algorithm. When data is sent and received in such a case, the transmission signal generating unit 13 enables the packet concatenation instruction flag.

Thus, according to the processing of destination selecting unit 12, an appropriate destination selection algorithm is selected in accordance with the type of application for data to be transmitted. With this arrangement, increased transmission efficiency in data transmission can be realized.

Fourth Embodiment

Features to be implemented in the present embodiment will be briefly described. There may be a case where selection of a destination is performed using the max-queue algorithm while individual transmission candidates are connected through a TCP connection. In this case, a transmission opportunity for a destination candidate to which only a small number of transmission attempts have been made may eventually become unavailable. To prevent such disconnection of communication, in this embodiment, a queuing time of data to be transmitted each destination candidate is used as a factor for the selection of the destination.

Figure 4:
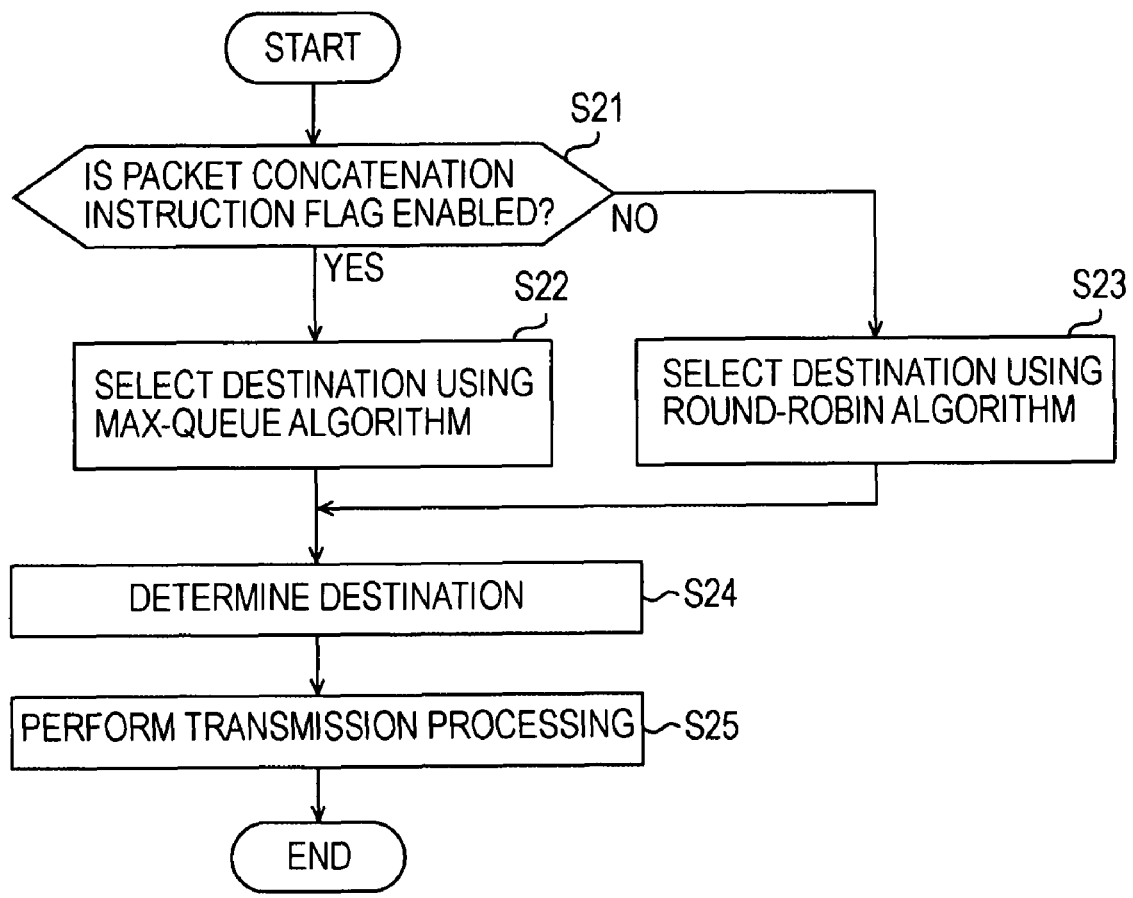
FIG. 4 is a flowchart illustrating a processing procedure performed by a destination selecting unit according to an embodiment of the present invention.
Figure 5:
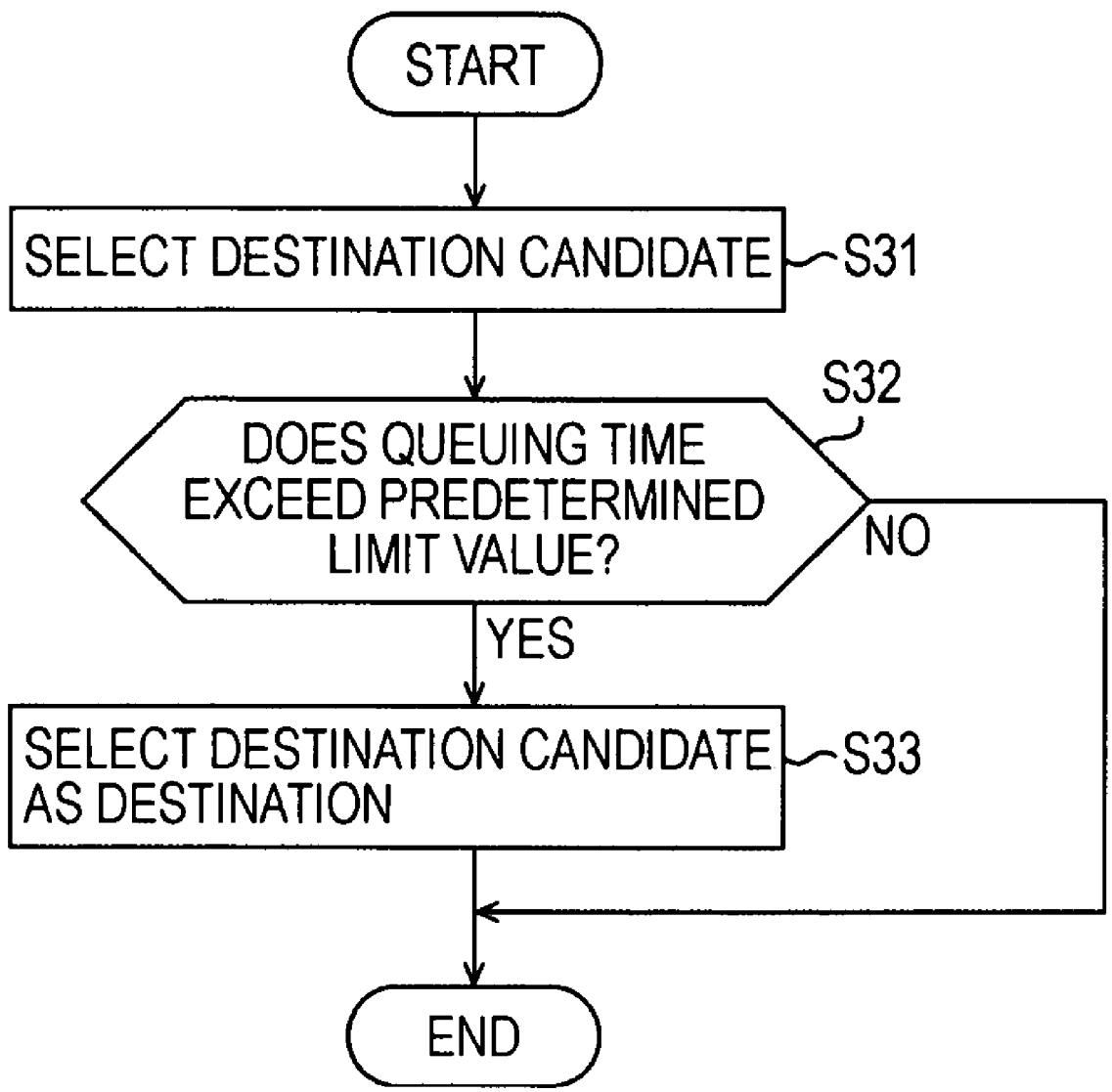
FIG. 5 is a flowchart illustrating a processing procedure performed by a destination selecting unit according to an embodiment of the present invention.

Referring to FIG. 5, a processing procedure performed by the destination selecting unit 12 will be described. This procedure is to be performed subsequently to the processing of STEP S22 described with reference to FIG. 4. Thus, it is herein assumed that the destination selecting unit 12 has determined that the packet concatenation instruction flag is enabled and selected a destination using the max-queue algorithm in an earlier stage of the procedure, and then subsequent processing is performed as follows.

At STEP S31, the destination selecting unit 12 selects a destination candidate from a transmission buffer 11 and reads out the stored time of packets to be transmitted to the destination candidate from a corresponding queue of the transmission buffer 11.

At STEP S32, the destination selecting unit 12 calculates the queuing time of the packets from the read stored time. Then, the destination selecting unit 12 determines whether or not the calculated queuing time exceeds a predetermined limit value. If it is determined that the queuing time exceeds the limit value, the procedure proceeds to STEP S33. On the other hand, if it is determined that the queuing time does not exceed the limit value, the processing is terminated. Note that the limit value is obtained by subtracting a value corresponding to a predetermined allowance from a value corresponding to the maximum allowable transmission delay time which depends on the type of application for the data to be transmitted to the destination candidate.

At STEP S33, the destination selecting unit 12 selects the destination candidate of the packets whose queuing time exceeds the limit value as the actual destination. Specifically, the destination selecting unit 12 changes the destination from the destination candidate that has been selected using the max-queue algorithm to the destination candidate of the packets whose queuing time exceeds the limit value.

As described in the foregoing, there is a case where selection of a destination is performed using the max-queue algorithm while individual transmission candidates are connected through a TCP connection. In this case, there may be a situation in which a transmission opportunity for a destination candidate to which only a small number of transmission attempts have been made may become unavailable. To address this, in this embodiment, a transmission opportunity is equally given to every destination candidate without allowing a transmission delay time of data for each destination candidate to exceed the maximum allowable transmission delay time. Therefore, disconnection of communication with each destination candidate, which is associated with the max-queue algorithm, can be prevented.

Fifth Embodiment

In this embodiment, the number of retransmission attempts to each destination candidate is considered. Then, transmission opportunity for a destination candidate in a poor communication state to which a large number of retransmission attempts have been made is reduced. On the other hand, transmission opportunity for a destination candidate in a good communication state is preferentially increased. This arrangement increases communication efficiency of an entire communication system.

Specifically, the transmission control unit 1 counts the number of transmission attempts to each destination. When an ACK notifying of normal reception of transmission data is returned from a destination, the transmission control unit 1 resets the number of retransmission attempts to the destination to 0.

Figure 6:
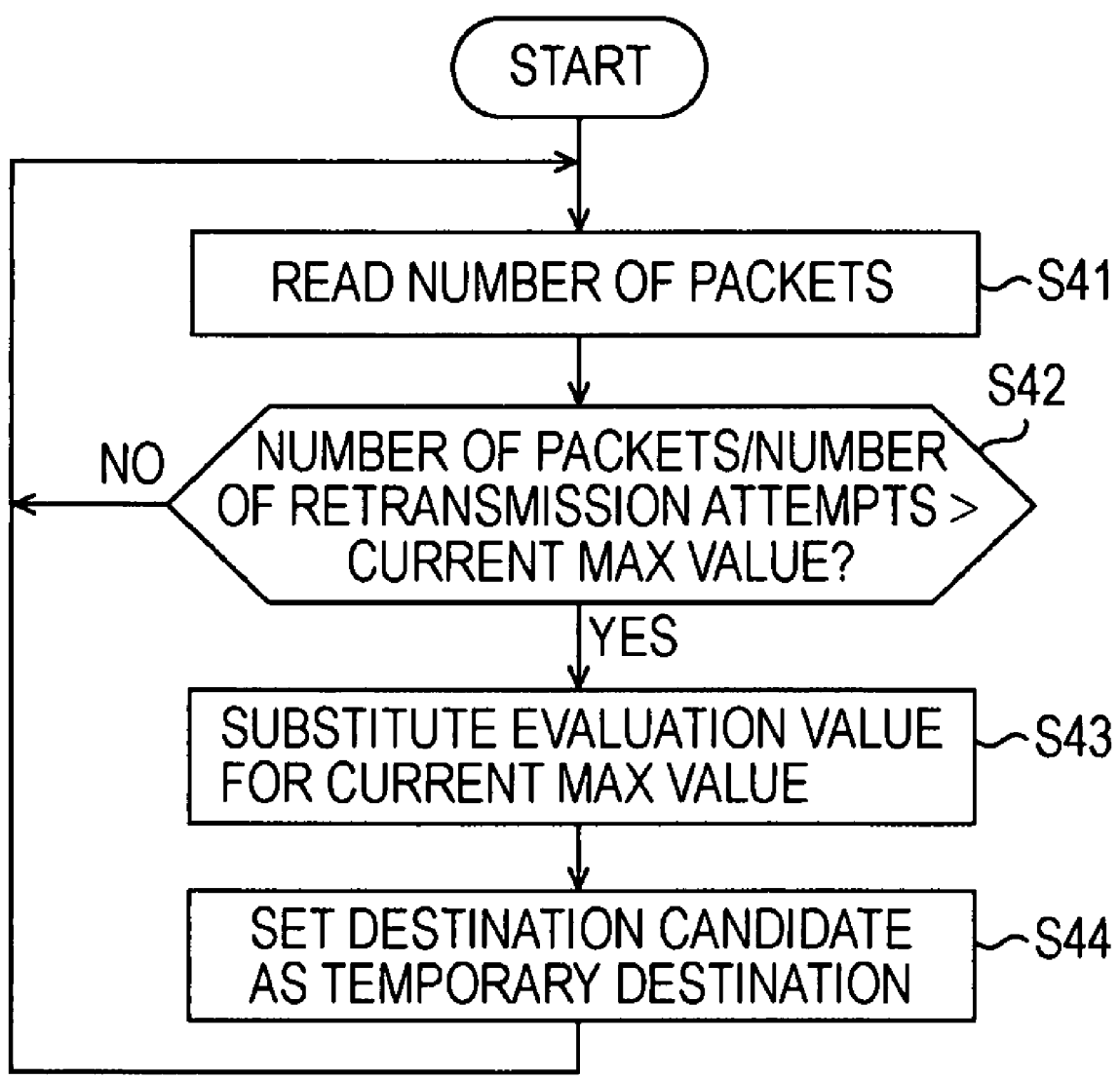
FIG. 6 is a flowchart illustrating a processing procedure performed by a destination selecting unit according to an embodiment of the present invention.

Referring now to FIG. 6, a processing procedure performed by the destination selecting unit 12 according to this embodiment will be described. This procedure is to be performed subsequently to the processing of STEP S22 described with reference to FIG. 4. Thus, it is herein assumed that the destination selecting unit 12 has determined that the packet concatenation instruction flag is enabled and selected a destination using the max-queue algorithm in an earlier stage of the procedure, and then subsequent processing is performed as follows.

At STEP S41, the destination selecting unit 12 reads out from the transmission buffer 11 the number of stored packets to be transmitted to the destination candidate.

At STEP S42, the destination selecting unit 12 calculates an evaluation value by dividing the read number of stored packets by the number of retransmission attempts that have been made to the destination candidate. Then, the destination selecting unit 12 then compares the evaluation value with a CurrentMax value. If it is determined that the evaluation value exceeds the CurrentMax value, the procedure proceeds to STEP S43. On the other hand, if it is determined that the evaluation value does not exceed the CurrentMax value, the procedure is terminated. The initial value of the CurrentMax value is zero, and the CurrentMax value is updated in the processing of STEP S43 described below.

At STEP S43, the destination selecting unit 12 substitutes the evaluation value calculated in the processing of STEP S42 for the CurrentMax value.

At STEP S44, the destination selecting unit 12 selects the destination candidate as a temporary destination, and the procedure returns to STEP S41.

As described above, this processing procedure is executed so that evaluation is sequentially performed on each destination candidate and thus a destination is eventually determined. Thus, since the evaluation value decreases with increasing number of retransmission attempts made to a destination candidate, the possibility that this destination candidate is selected as the destination will be reduced. Accordingly, the number of retransmission attempts to a destination candidate in a poor communication state can be decreased so that communication resources allocated to this destination candidate can be reduced. As a result, the speed of communication with the destination candidate in a poor communication state is decreased. However, the communication speed in the entire communication system can be substantially increased.

Sixth Embodiment

In this embodiment, a destination candidate of data for an application in which transmission delay and fluctuation in the communication speed have to be reduced in advance of transmission is preferentially selected as an actual destination, so that communication efficiency of an entire communication system is increased.

Figure 7:
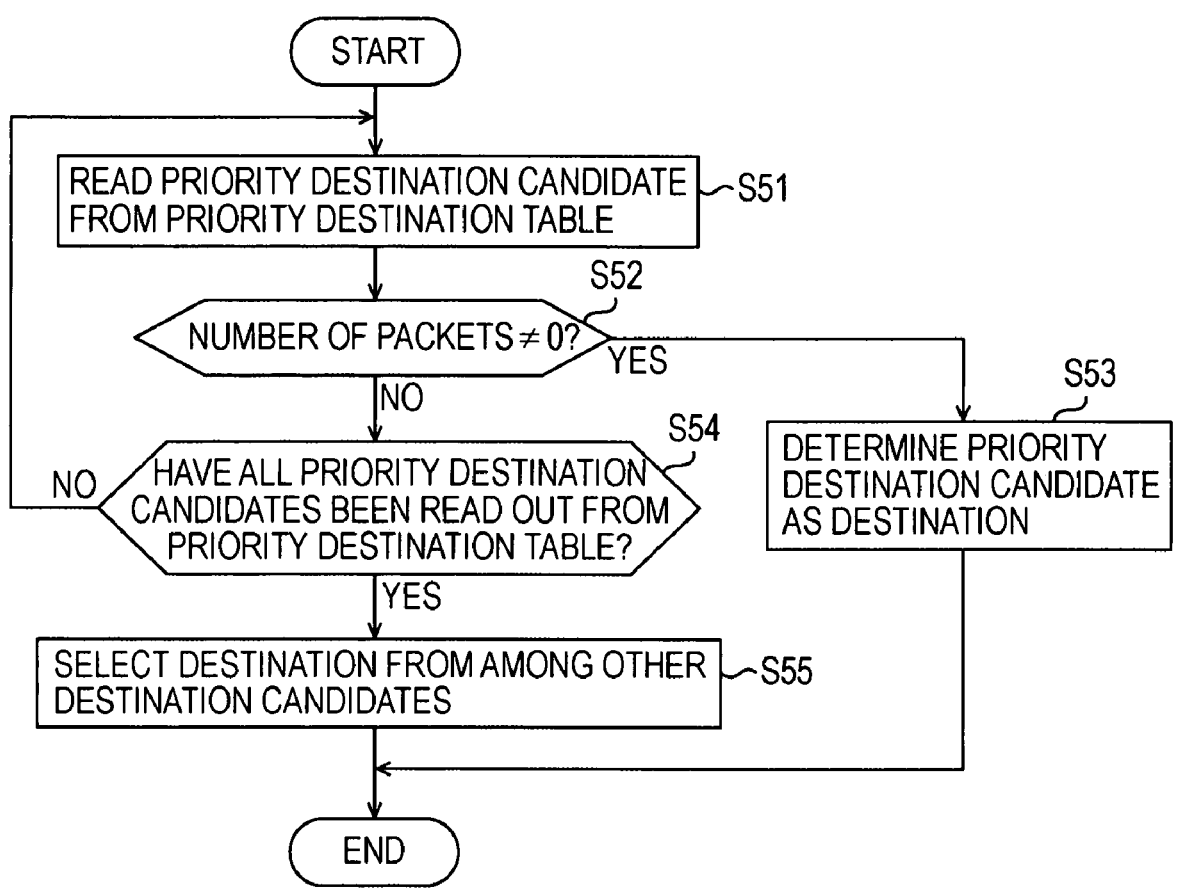
FIG. 7 is a flowchart illustrating a processing procedure performed by a destination selecting unit according to an embodiment of the present invention.
Figure 8:
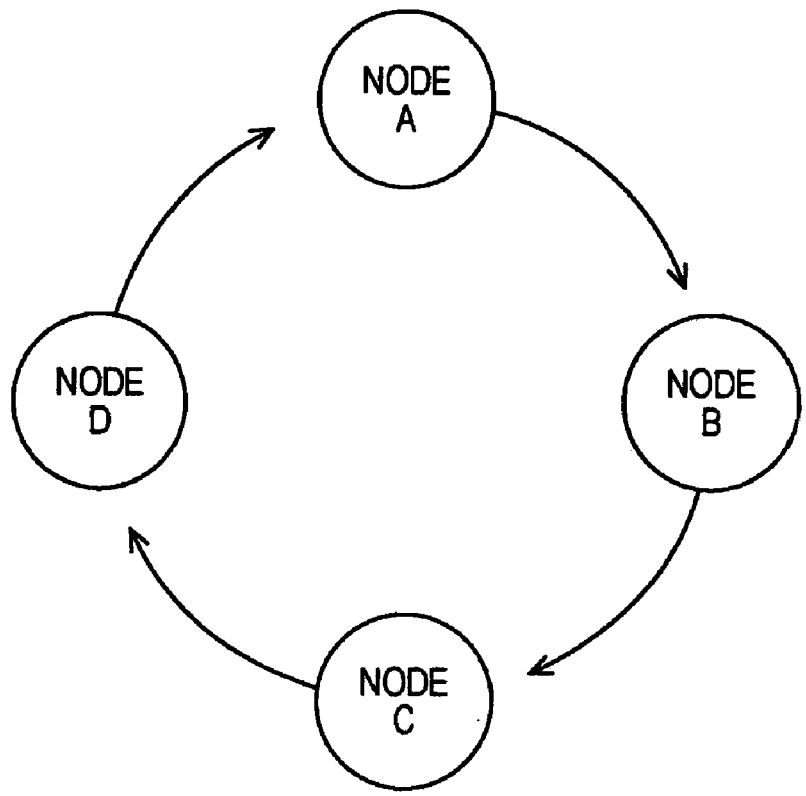
FIG. 8 schematically illustrates a destination selection scheme using a round-robin algorithm.
Figure 9:
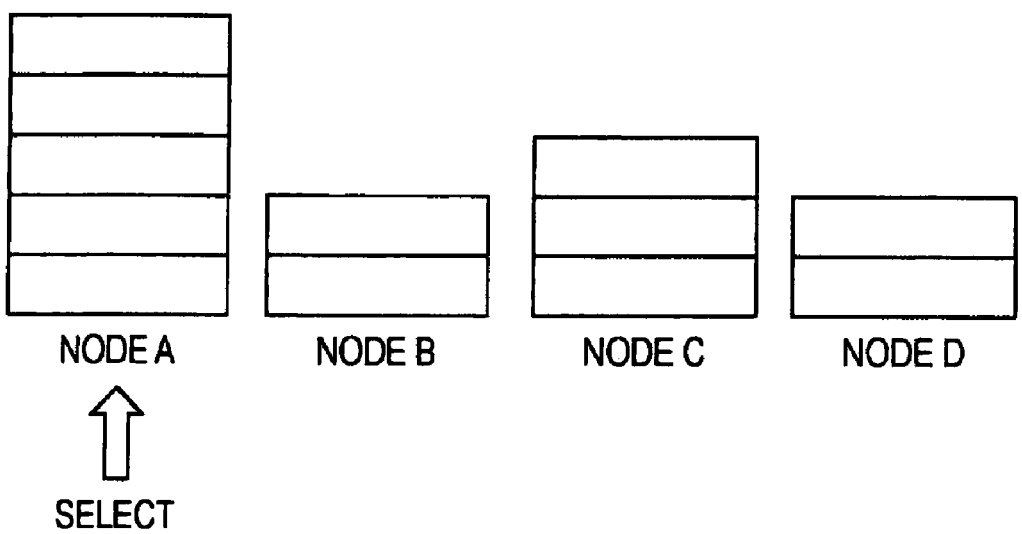
FIG. 9 schematically illustrates a destination selection scheme using a max-queue algorithm.
Figure 10:
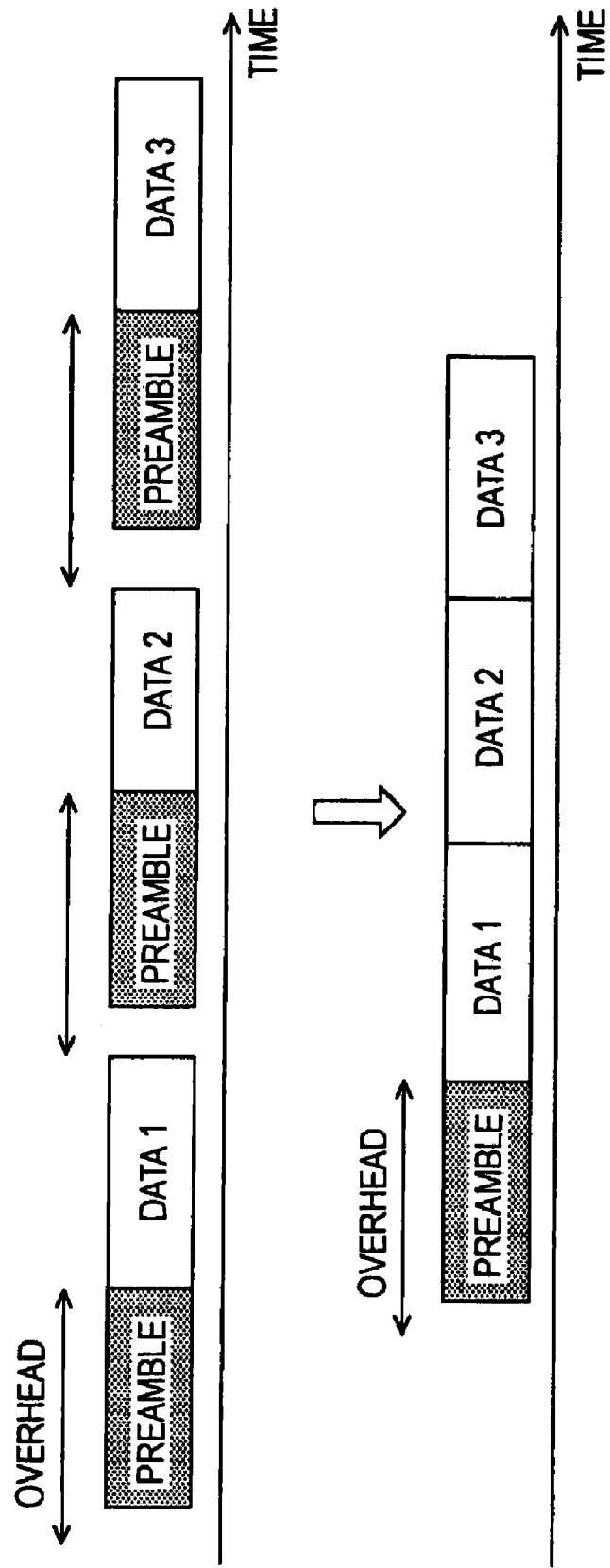
FIG. 10 schematically illustrates a processing procedure for concatenating packets so as to generate a transmission frame.
Figure 11:
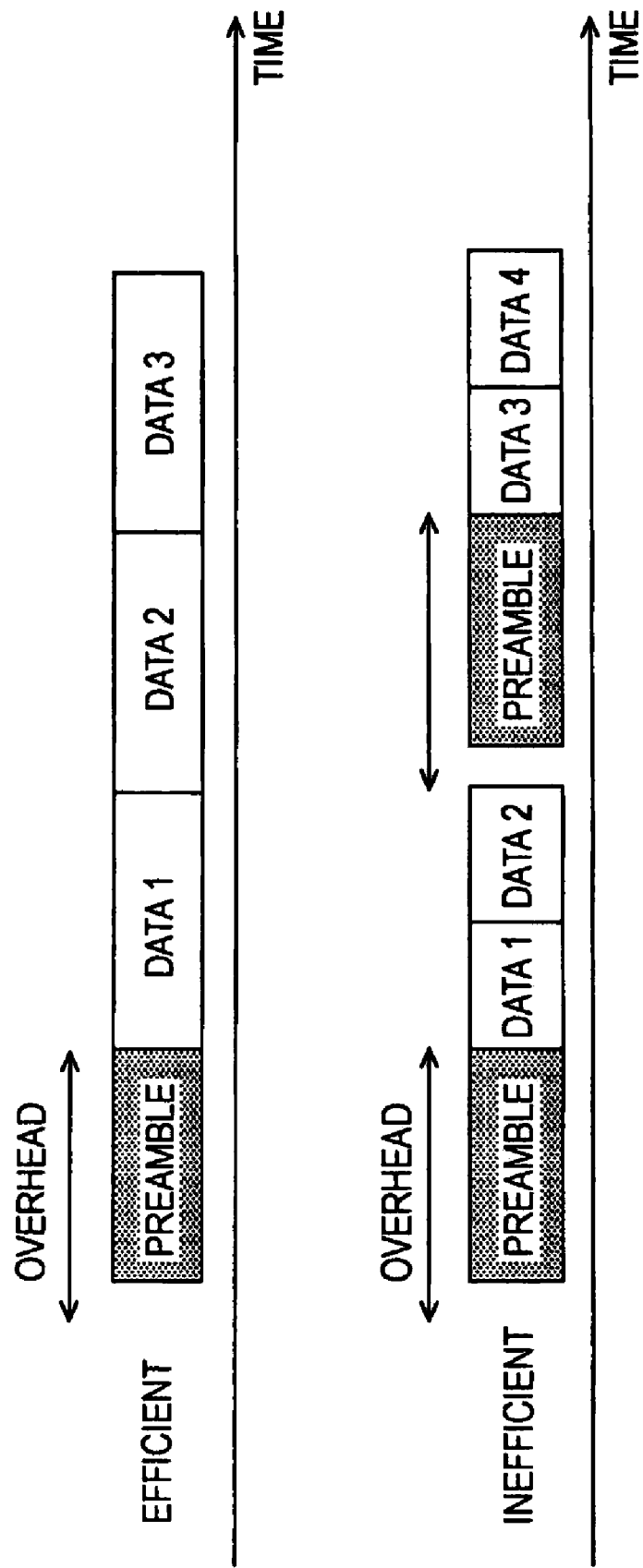
FIG. 11 schematically illustrates a processing procedure for concatenating packets so as to generate a transmission frame.

The transmission control unit 1 according to the present embodiment is provided with a priority destination table for storing a priority destination candidate to which data has to be transmitted with a higher priority than other destination candidates. The destination selecting unit 12 performs a processing procedure using this priority destination table, which is described below with reference to FIG. 7.

At STEP S51, the destination selecting unit 12 reads out a priority destination candidate from the priority destination table.

At STEP S52, the destination selecting unit 12 determines whether or not a packet is stored in a queue of the transmission buffer 11 storing data to be transmitted to the read priority destination candidate. If it is determined that a packet is stored in the queue, the procedure proceeds to STEP S53. On the other hand, if it is determined no packet is stored in the queue, the procedure proceeds to STEP S54.

At STEP S53, the destination selecting unit 12 selects the priority destination candidate as the destination. Then, the transmission signal generating unit 13 generates a transmission signal for the selected destination.

At STEP S54, the destination selecting unit 12 determines whether or not all priority destination candidates have been read out from the priority destination table. If it is determined that all priority destination candidates have been read out, the procedure proceeds to STEP S55. If it is determined that all priority destination candidate have not been read out, the processing returns to STEP S51.

At STEP S55, the destination selecting unit 12 performs the processing of STEP S21 to STEP S25 of FIG. 4 on a destination candidate other than the priority destination candidates so as to select the destination. Then, the transmission signal generating unit 13 generates a transmission signal for the selected destination.

As described above, the destination selecting unit 12 first preferentially selects a priority destination candidate as the destination and then initiates destination selection processing on the other destination candidates. Thus, when a destination candidate to which data is requested to be sent with reduced transmission delay and fluctuation of transmission speed is stored in the priority destination table, the destination selecting unit 12 can select the destination so as to satisfy the request.

It should be understood by those skilled in the art that various modifications, combinations, sub-combinations and alterations may occur depending on design requirements and other factors insofar as they are within the scope of the appended claims or the equivalents thereof.

What is claimed is:

1. A communication apparatus for transmitting data to a destination, comprising:
    a storage unit having a plurality of storage areas corresponding to a plurality of destination candidates of a destination of data to be transmitted;
    a detecting unit for detecting a number of packets and an amount of data stored in each of the storage areas;
    a destination selecting unit for selecting a destination from among the destination candidates on the basis of at least the number of packets and the amount of data detected by the detecting unit, wherein the selecting comprises:
        identifying appropriate destination candidates from among the destination candidates, the identifying comprising:
            determining, for the appropriate destination candidates, that (i) corresponding numbers of stored packets exceed a first threshold and (ii) corresponding amounts of stored data exceed a second threshold; and
        selecting the destination from among the appropriate destination candidates; and
    a transmission signal generating unit for reading out a predetermined amount of data to be transmitted to the destination selected by the destination selecting unit, from the corresponding storage area, and generating a transmission signal.

2. The communication apparatus of claim 1, wherein:
    the detecting unit further detects, from the individual storage areas, a size of the packets for each of the destination candidates;
    the destination selecting unit:
        sets a third threshold for a size of the packets; and
        determines, for the appropriate destination candidates, that corresponding sizes of stored packets exceed the third threshold; and
    the transmission signal generating unit concatenates a plurality of packets for the destination so as to generate the transmission signal.

3. The communication apparatus of claim 2, wherein:
    the detecting unit detects from the individual storage areas a transmission waiting time of packets in addition to the number of packets and the sizes of the packets for each of the destination candidates, the transmission waiting time starting at a time point when the packets are stored in the storage unit and ending at a time point when the packets are read out by the transmission signal generating unit; and
    the destination selecting unit sets a threshold for the transmission waiting time and selects a destination candidate for packets whose transmission waiting time exceeds the threshold as the destination over the appropriate destination candidate.

4. The communication apparatus of claim 1, wherein:
    the transmission signal generating unit determines whether or not concatenating a plurality of packets to generate the transmission signal is effective, on the basis of a result of the detection performed by the detecting unit; and
    the destination selecting unit:
        selects the destination from among the appropriate destination candidates on the basis of an algorithm for selecting a destination candidate as the destination from among the appropriate destination candidates, the selected destination candidate being for packets stored in the storage unit in the greatest number, if it is determined that concatenating a plurality of packets to generate the transmission signal is effective; and
        selects the destination from among the appropriate destination candidates on the basis of an algorithm for sequentially selecting each of the destination candidates as the destination, if it is determined that concatenating a plurality of packets to generate the transmission signal is not effective.

5. The communication apparatus of claim 1, wherein:
    the detecting unit detects, from the individual storage areas, a size of the packets and a transmission time of the packets for each of the transmission candidates; and
    the destination selecting unit sets a predetermined threshold for each of the detected size of the packets and the transmission time of the packets, and selects a destination candidate as the destination from among the appropriate destination candidates, the selected destination candidate being for packets for which at least either the size or the transmission time exceeds the corresponding threshold.

6. The communication apparatus of claim 1, wherein:
    the destination selecting unit calculates an evaluation value obtained by dividing the detected number of stored packets by the number of retransmission attempts for each of the destination candidates and selects an appropriate destination candidate of the greatest evaluation value as the destination.

7. The communication apparatus of claim 1, further comprising:
    a priority destination table storing at least one priority destination candidate selected from among the destination candidates, wherein:
        the detecting unit detects the number of stored packets for the priority destination candidate from the corresponding storage area; and
        the destination selecting unit determines whether or not there is a priority destination candidate for packets for which the number of detected by the detecting unit is not zero, so as to more preferentially select the priority destination candidate as the destination over other destination candidates if it is determined that there is a priority destination candidate for packets for which the number of is not zero and select the destination from among the other destination candidates if it is determined that there is not a priority destination candidate for packets for which the number of is not zero.

8. A transmission control method for a communication apparatus, the method comprising the steps of:
    detecting, from a storage unit having a plurality of storage areas corresponding to a plurality of destination candidates of a destination of data to be transmitted, a number of packets and an amount of data stored in each of the storage areas;

selecting the destination from among the destination candidates on the basis of at least the number of packets and the amount of data detected in the detecting step, wherein the selecting step comprises:
  identifying appropriate destination candidates from among the destination candidates, the identifying comprising:
    determining, for the appropriate destination candidates, that (i) corresponding numbers of stored packets exceed a first threshold and (ii) corresponding amounts of stored data exceed a second threshold; and
  selecting the destination from among the appropriate destination candidates; and
reading a predetermined amount of data for the selected destination from the corresponding storage area and generating a transmission signal.

9. A non-transitory computer readable medium storing instruction that, when executed by a computer provided in a communication apparatus for performing communication with a plurality of destination candidates, performs a method comprising:
  detecting, from a storage unit having a plurality of storage areas corresponding to a plurality of destination candidates of a destination of data to be transmitted, a number of packets and an amount of data stored in each of the storage areas;
  selecting the destination from among the destination candidates on the basis of at least the number of packets and amount of data detected in the detecting step, wherein the selecting step comprises:
    identifying appropriate destination candidates from among the destination candidates, the identifying comprising:
      determining, for the appropriate destination candidates, that (i) corresponding numbers of stored packets exceed a first threshold and (ii) corresponding amounts of stored data exceed a second threshold; and
    selecting the destination from among the appropriate destination candidates; and
  reading a predetermined amount of data for the selected destination from the corresponding storage area and generating a transmission signal.

\* \* \* \* \*